United States Patent
Boehringer et al.

(10) Patent No.: US 6,412,590 B1
(45) Date of Patent: Jul. 2, 2002

(54) DEVICE FOR STEERING A MOTOR VEHICLE HAVING AT LEAST TWO ACTUATING PARTS

(75) Inventors: Michael Boehringer, Waiblingen; Lutz Eckstein, Stuttgart, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/384,985

(22) Filed: Aug. 30, 1999

(30) Foreign Application Priority Data

Aug. 28, 1998 (DE) .......................... 198 39 351

(51) Int. Cl.⁷ ................................ B62D 5/00
(52) U.S. Cl. ..................................... 180/402
(58) Field of Search ................ 180/402, 400, 180/333, 335

(56) References Cited

U.S. PATENT DOCUMENTS

| | | | | |
|---|---|---|---|---|
| 5,172,785 A | * | 12/1992 | Takahashi | 180/271 |
| 5,275,250 A | * | 1/1994 | Muller et al. | 180/402 |
| 5,603,674 A | * | 2/1997 | Rivas et al. | 477/170 |
| 5,653,304 A | * | 8/1997 | Renfroe | 180/402 |
| 5,873,430 A | * | 2/1999 | Mueller et al. | 180/402 |
| 6,082,482 A | * | 7/2000 | Kato et al. | 180/402 |
| 6,167,981 B1 | * | 1/2001 | Boehringer et al. | 180/333 |

FOREIGN PATENT DOCUMENTS

| | | |
|---|---|---|
| DE | 196 25 496 A1 | 1/1998 |
| DE | 197 02 313 | 4/1998 |
| EP | 0 591 890 A1 | 4/1994 |
| GB | 2 314 608 * | 7/1998 |
| JP | 6-1255 | 1/1994 |
| JP | 343531996 | 2/1996 |
| JP | 10-194152 | 7/1998 |
| JP | 10-203398 | 8/1998 |

* cited by examiner

Primary Examiner—Kevin Hurley
(74) Attorney, Agent, or Firm—Crowell & Moring LLP

(57) ABSTRACT

The driver is able to predefine the desired value for the transverse dynamic behavior of the vehicle on the two or more two actuating parts. The desired value is determined as a function of the operating force applied by the driver to the actuating parts. The desired value for the transverse dynamic behavior is adjusted via actuating members. The current value for the transverse dynamic behavior which is produced by the actuating members is determined. The current value is assigned a desired deflection of the actuating parts from the rest position, and the determined desired deflection of the actuating part is adjusted on each actuating part via an actuating part control device assigned thereto.

11 Claims, 1 Drawing Sheet

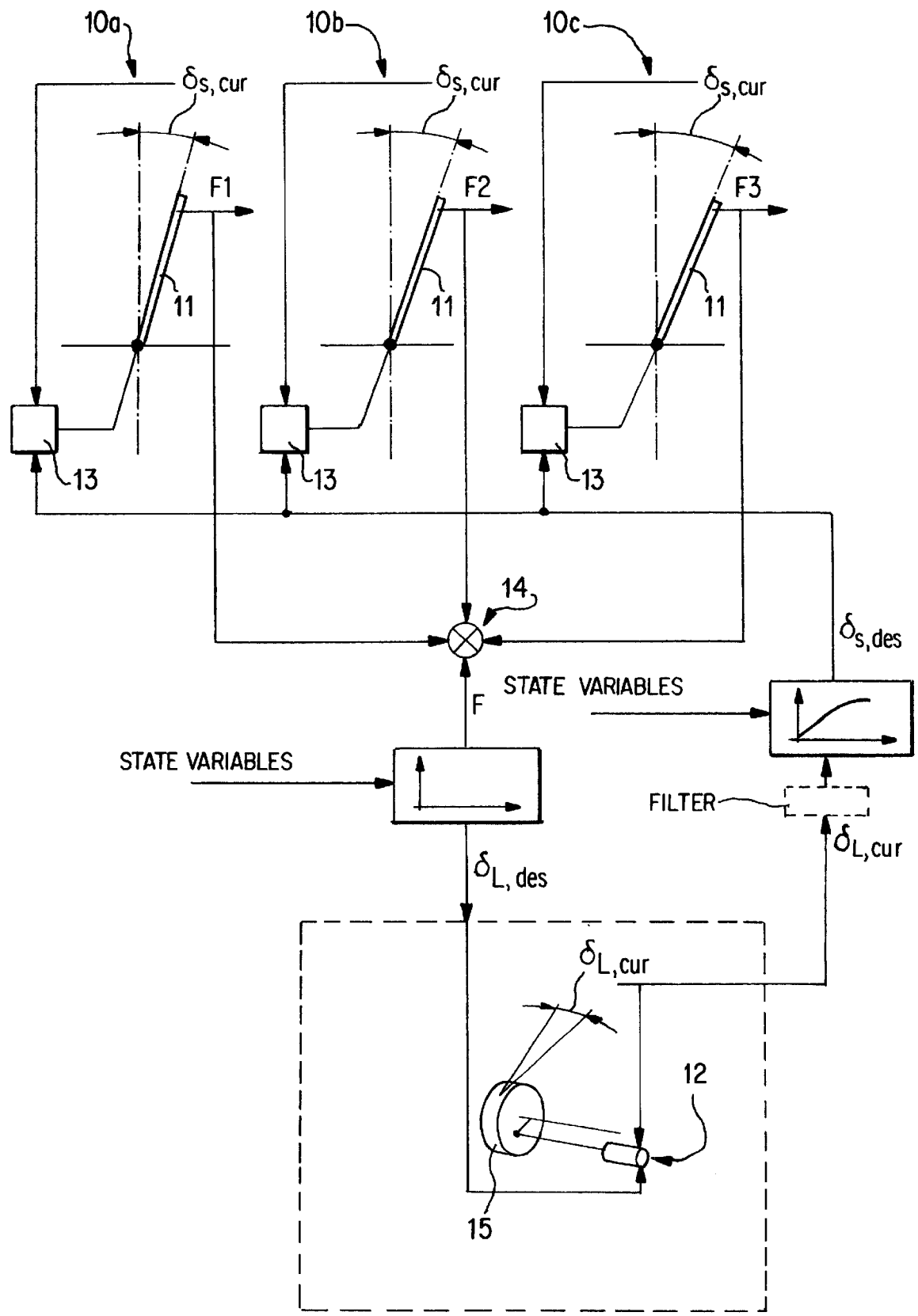

DEVICE FOR STEERING A MOTOR VEHICLE HAVING AT LEAST TWO ACTUATING PARTS

This application claims the priority of 198 39 351.2–21, filed Aug. 28, 1998, the disclosure of which is expressly incorporated by reference herein.

BACKGROUND OF THE INVENTION

The present invention relates to a device for steering a motor vehicle having two or more actuating parts.

DE 196 25 496 A1, discloses vehicle steering via actuating parts which themselves do not have any mechanical connection to the steered wheels. On such an actuating part, the driver predefines at least the desired value for the wheel steering angle for the steered wheels. Desired values for further actuating variables, such as vehicle speed and vehicle retardation, can also be predefined via the same actuating part. For example, two or more actuating parts are provided, via which the driver can predefine the desired value for the direction of travel. The actuating parts can be connected to one another mechanically or hydraulically.

For instance, EP 0 591 890 A1 discusses active actuating parts with force feedback in which haptic feedback is produced via actuating part control devices. A force which counteracts the deflection of the actuating part from its rest position is assigned via a characteristic map and is produced. For the purpose of coupling between the actuating parts, the same counteracting force can be produced on all the actuating parts. As a result, the impression of a coupling between the active actuating parts is produced.

Known mechanical or hydraulic coupling systems disadvantageously cannot be used in so-called active actuating parts having angle feedback. The known coupling of active actuating parts with force feedback in turn has the disadvantage that, when it is used in the motor vehicle, it is not ensured that the deflection of the actuating part from the rest position has a unique relationship to the actual transverse dynamic vehicle state (for example the steering angle produced on the steered wheels). For feeding back the steering angle of the wheels, this occurs when, as a result of mechanical influences (obstacles) on the wheels, the actuating members arranged at the wheel are not capable of adjusting the desired steering angle.

SUMMARY OF THE INVENTION

An object of the present invention is therefore, active actuating parts for steering a motor vehicle, to produce, on one hand a unique relationship between the wheel steering angles actually produced and to establish, on the other hand, the impression of a mechanical coupling of the actuating parts to one another.

This object has been achieved in accordance with the present invention by a device wherein the desired value for the transverse dynamic behavior ($\delta_{L,des}$) is determined from the forces acting on the actuating parts, and in that the current value ($\delta_{L,cur}$) of the transverse dynamic behavior produced by the actuating members is determined, a desired deflection ($\delta_{s,des}$) for the actuating parts being determined from the current value of the transverse dynamic behavior ($\delta_{L,cur}$), and each actuating part being assigned an actuating part control device by means of which the determined desired deflection ($\delta_{s,des}$) of the actuating part is adjusted.

The driver is able to predefine the desired vehicle transverse dynamics, for example the desired steering angle for the steered wheels, on at least two actuating parts. The desired value for the vehicle transverse dynamics is determined from the forces acting on the actuating parts. For this purpose, the mean value or the sum of the forces acting on the at least two actuating parts can, for example, be formed in a manner known per se, and this value can be assigned, via a characteristic map, a desired value for the vehicle transverse dynamics.

The desired value for the vehicle transverse dynamics is adjusted via the actuating members assigned to the steered wheels. The actual (current) value of the vehicle transverse dynamics which is produced by the actuating members, e.g., the wheel steering angle of steered wheels, is determined. The current transverse dynamic behavior is assigned a desired deflection of the actuating parts from the rest position, and the determined desired deflection of the actuating part is adjusted on each actuating part via an assigned actuating part control device.

The device according to the invention ensures that the driver obtains the impression that the actuating parts are connected to one another mechanically. The predefined relationship between the deflection of the actuating part and the actual vehicle transverse dynamics is always maintained.

According to another aspect of the invention, a desired steering angle is predefined via the actuating part, and the wheel steering angle is controlled in accordance with the predefinition of the desired steering angle via actuating members. The actuating part control device then controls the deflection of the actuating part on the basis of the wheel steering angle registered. Particularly advantageous aspects are the duration of the control cycles of the actuating part control device and actuating members being independent of one another. In order to achieve a jolt-free, continuous actuating part movement as sensed by the driver, it may be advantageous to operate on the actuating part control device with shorter control cycles than on the actuating members. In this case, it may additionally be advantageous to filter the determined current transverse dynamic behavior for the purposes of controlling the actuating part movement, in order that small control deviations do not lead to behavior of the actuating part which is unpleasant for the driver.

BRIEF DESCRIPTION OF THE DRAWINGS

Other objects, advantages and novel features of the present invention will become apparent from the following detailed description of the invention when considered in conjunction with the accompanying drawings in which:

The single FIGURE is a schematic view of a device according to the present invention.

DETAILED DESCRIPTION OF THE DRAWINGS

The device has the three actuating parts 10a, 10b and 10c, which are each formed by a lever 11, which can be pivoted about an axis, and an actuating part control device 13. On each of the actuating parts 10a, 10b, 10c, the operating force F1, F2 and F3 applied thereto by the driver is determined. The values determined are used in a linking or summation unit 14 to determine a single operating force value F, for example by forming a mean value. From this operating force—if necessary taking into account state variables of the vehicle, such as the vehicle speed and possibly also the time—the desired steering angle $\delta_{L,des}$ is determined and adjusted via the actuating members 12 on the steered wheels 15.

The wheel steering angle $\delta_{L,cur}$ actually provided is determined and fed back to the actuating members 12 in order to form the control loop. The wheel steering angle $\delta_{L,cur}$ if necessary taking into account state variables of the vehicle, such as the vehicle speed—is used to determine the desired deflection $\delta_{b,des}$ of the levers 11, and is fed to the respective actuating part control device 13. The deflection $\delta_{s,cur}$ of the lever 11 from its rest position as a result of being pivoted about its axis is produced on the lever 11 of the actuating part via the respective actuating part control device 13. In order to complete the control path on the respective actuating part, the actual deflection $\delta_{s,cur}$ is fed back to the respective actuating part control device 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for steering a motor vehicle, comprising at least two actuating parts via which a driver predefines at least one desired value for transverse dynamic behavior ($\delta_{L,des}$) the motor vehicle, at least one of the actuating parts being operable to predefine the desired value to produce a deflection of the at least one actuating part from a non-operated rest position thereof, and at least one actuating member configured and arranged to implement the desired value for the transverse dynamic behavior, wherein the actuating parts are configured such that the desired value for the transverse dynamic behavior ($\delta_{L,des}$) is determined from forces acting thereon, and a determinative in provided for determining a current value ($\delta_{L,cur}$) of the transverse dynamic behavior produced by the at least one actuating member, and a desired deflection ($\delta_{s,des}$) for the actuating parts characteristic of the current value of the transverse dynamic behavior is determined from the current value of the transverse dynamic behavior ($\delta_{L,cur}$), each of the at least two actuating parts being associated with an actuating part control device for adjusting the determined desired deflection ($\delta_{s,des}$) thereof.

2. The device according to claim 1, wherein the desired value representing the transverse dynamic behavior is a desired steering angle ($\delta_{L,des}$), and the current value representing the transverse dynamic behavior is an actual wheel steering angle ($\delta_{L,cur}$), with the at least one actuating member being arranged to implement the desired steering angle ($\delta_{L,des}$) onto the steered wheels.

3. The device according to claim 1, wherein the actuating parts are levers arranged to be pivoted about a pivot axis, and an angle of rotation ($\delta_{s,cur}$) of the lever about the associated pivot axis represents the deflection of the actuating part from the rest position thereof.

4. The device according to claim 1, wherein a duration of a control cycle for the actuating members is different from a duration of a control cycle for the actuating part control device.

5. The device according to claim 4, wherein the desired value representing the transverse dynamic behavior is a desired steering angle ($\delta_{L,des}$), and the current value representing the transverse dynamic behavior is an actual wheel steering angle ($\delta_{L,cur}$), with the at least one actuating member being arranged to implement the desired steering angle ($\delta_{L,des}$) onto the steered wheels.

6. The device according to claim 5, wherein the actuating parts are levers arranged to be pivoted about a pivot axis, and an angle of rotation of the lever about the associated pivot axis represents the deflection of the actuating part from the rest position thereof.

7. The device according to claim 3, wherein a duration of a control cycle of the actuating part control device is less than a duration of a control cycle for the actuating members.

8. A motor vehicle steering method, comprising the steps of
    (a) predefining at least one desired value for transverse vehicle dynamic behavior using at least two actuating parts from a non-operated rest position thereof;
    (b) determining the at least one desired value from forces acting on the actuating parts;
    (c) adjusting the transverse vehicle dynamic behavior by the at least one desired value via actuating members assigned to steered vehicle wheels;
    (d) determining a current value of the transverse vehicle dynamic behavior produced by the actuating members acting on the steered vehicle wheels;
    (e) d determining a desired deflection for the actuating parts from the rest position from the current value; and
    (f) adjusting each of the at least two actuating parts to the desired deflection via a respective actuating part control device.

9. The device according to claim 4, wherein a filter is provided to filter small deviations in the current value of the transverse dynamic behavoir.

10. A device for steering a motor vehicle, comprising at least two actuating parts via which at least one desired value for a transverse dynamic behavior of the motor vehicle is predefined,
    a determinative to determine the desired value from forces acting on the actuating parts,
    at least one actuating member to control the transverse dynamic behavior in accordance with the desired value,
    a second determinative to determine a current value of the transverse dynamic behavior,
    a third determinative to determine a deflection of the actuating parts according to the current value, and
    an actuating part control device for each of the actuating parts to impart the deflection.

11. A motor vehicle steering method, comprising the steps of
    (a) predefining a desired steering angle via forces on at least two actuating parts;
    (b) controlling a wheel steering angle in accordance with the forces via actuating members, and
    (c) controlling a deflection of the at least two actuating parts via respective actuating part control devices in accordance with a current registered wheel steering angle.

* * * * *